United States Patent [19]

Wallyn

[11] 3,936,078
[45] Feb. 3, 1976

[54] DAMPING DEVICE FOR COUPLING TOGETHER PIPING ELEMENTS

[76] Inventor: René Wallyn, 77 Claye-Souilly, France

[22] Filed: May 17, 1974

[21] Appl. No.: 470,830

[30] Foreign Application Priority Data

Apr. 17, 1974 France .............................. 74.13388

[52] U.S. Cl. ..................... 285/49; 285/61; 285/292; 285/330
[51] Int. Cl.² ......................................... F16L 11/12
[58] Field of Search ............. 285/49, 50, 51, 48, 52, 285/53, 330, 61, 331, 62, 369, 64, DIG. 9, 289, 290, 292, 294; 403/220, 223, 266, 267; 64/11 R, 11 F, 16, 27 NM

[56] References Cited
UNITED STATES PATENTS

| | | |
|---|---|---|
| 1,040,971 | 10/1912 | Wist.................................. 285/53 X |
| 1,231,202 | 6/1917 | Saylor................................ 285/53 X |
| 2,211,776 | 8/1940 | Haury............................ 285/DIG. 9 |
| 2,316,166 | 4/1943 | Huguelet............................ 285/64 X |

FOREIGN PATENTS OR APPLICATIONS 536,846   5/1941   United Kingdom................... 285/53

*Primary Examiner*—Dave W. Arola
*Attorney, Agent, or Firm*—Arthur B. Colvin

[57] ABSTRACT

The invention relates to a damping device which comprises an elastic sleeve over-moulded on two coupling end members provided with transverse grooves for the anchorage of this latter, the transverse grooves opening into a section of the internal bore of each end member having a diameter greater than the diameter of the remainder of said bore.

3 Claims, 12 Drawing Figures

DAMPING DEVICE FOR COUPLING TOGETHER PIPING ELEMENTS

A damping device suitable for coupling together two lengths of piping intended to permit the conveyance of a fluid under pressure is already known, this damping device comprising two tubular end members which are suitable spaced apart from each other for coupling to the said lengths of piping, and which comprise on their periphery a number of transverse grooves, the said transverse grooves opening into the internal bores of the said end-members, an elastic sleeve moulded on the exterior of the said end-members, and a tubular covering jacket which encloses the said sleeve and which is immobilized axially on the sleeve.

Damping devices of this kind advantageously interrupt the metallic continuity of the piping systems on which they are fitted, by dividing these piping systems into lengths elastically isolated from each other, so that the noises due to shocks or the like which are produced on such piping systems are no longer necessarily transmitted along these pipes.

In addition, damping devices of this kind, due to the elastic sleeve with which they are provided, advantageously absorb any possible expansion of the piping systems which they couple together.

The present invention has for its objects various improvements in such damping devices over the arrangement shown in French Pat. No. 7,222,499.

According to a first improvement, the internal bore of each tubular end-member of a damping device of the type briefly described above comprises two sections successively spaced apart axially from the exterior towards the interior, namely a first section having a diameter equal to that of the internal bore of the elastic sleeve with which it is provided, and a second section having a diameter greater than that preceding, and the transverse grooves provided on this tubular end-member open into the said second section of larger diameter of the said bore, in such manner that the material of the said elastic sleeve forms an internal sheath for the said second section of the said bore in a circularly-continuous manner.

By virtue of this arrangement, the anchorage of the elastic sleeve on the tubular end-members is improved, and the damping device thus improved is capable of withstanding with complete fluid-tightness, stresses much greater than those applied under the same conditions to comparable damping devices at present known.

The anchorage of the elastic sleeve on the tubular end-members is improved by forming longitudinally in the internal bore of these members, slots intersecting their transverse grooves, but on the one hand such slots do not improve the anchorage of the sleeve, except in a discontinuous manner and not in a circularly-continuous manner, and on the other hand the machining of such slots is substantially more difficult to effect than the simple excess bore necessary for carrying out the improvement according to the invention, as described above.

According to a second improvement forming the object of the present invention, at least one of the transverse grooves of a tubular end-member is angularly displaced with respect to the others about the axis of the said end-member.

This results axially in a baffle effect which still further improves the anchorage of the elastic sleeve on the tubular end-members, and also the fluid-tightness of such an anchorage.

This second improvement, which may be utilized independently of the first improvement described above, can be advantageously combined however with the latter, since the angular displacement of the transverse grooves of an end-member would, if there were associated with them slots formed longitudinally in the internal bore of these end-members, lead to a multiplication of these slots and these latter would then become difficult or even impossible to carry out, and in any case they would be expensive.

According to a third improvement forming the object of the present invention, which may be utilized independently of the improvements previously described, or conjointly therewith, the tubular covering jacket provided on the damping device carries fixing means intended to permit the adaptation of this latter on a support of any kind.

Thus, a damping device of this kind can advantageously serve in itself for fixing the piping systems on which it is fitted.

A fixation of this kind is usually effected by means of conventional devices, collars or flanges for example, which are directly fixed in the supporting surface on which the piping systems concerned are to be fixed.

These fixing devices unfortunately form vibration-conducting bridges which thus also conduct noises between the piping systems thus fixed and the said supporting surface, such bridges then forming with the said surface branch passages with respect to the damping devices coupling together the successive sections of these piping systems, to the prejudice of the effectiveness of the damping devices.

In order to overcome this drawback, it is known to provide these fixing devices with special anti-vibration means, this solution having the disadvantage of very connsiderably increasing the cost of erection of the piping systems.

In this respect, the invention makes it possible to eliminate economically the need for special anti-vibration devices, and to simplify the erection.

In all cases, the elastic sleeve preferably comprises depressions on its outer surface and in the central zone of this surface, forming between them ribs intended to be supported against the internal wall of the tubular covering jacket.

These depressions advantageously permit temporary deformation of the sleeve, for example as a result of momentary overpressures of the water-hammer type in the piping systems which it couples together, or alternatively of an expansion of these pipes. It thus enables the elasticity of the constituent material of such a sleeve to take effect, in spite of the tubular covering jacket enclosing this sleeve. This also results in an improvement in the damping of vibrations.

In all cases also, this tubular covering jacket is provided at its extremities with transverse edges directed radially in the direction of its axis, the said edges partly covering the corresponding extremeties of the elastic sleeve.

Thus, these edges advantageously insure conjointly, on the one hand the axial immobilization of the tubular covering jacket with respect to the elastic sleeve which it encloses, and on the other hand an axial retention of this elastic sleeve in both directions, capable of preventing undesirable axial elongation which may be the origin of the leakages.

In all cases, the tubular end-members are preferably cut-off from hollow rods with a polygonal external section, hexagonal for example, so that when an elastic sleeve is overmoulded on these tubular end-members, this sleeve is fixed to the said end-members both axially, due inter alia to the transverse grooves formed for that purpose on the said end-members, and transversely by reason of the polygonal external section of these end-members.

Preferably, and according to another improvement forming the object of the present invention, level with the transverse edges formed on the covering jacket at its extremities, the tubular end-members are provided peripherally with a transverse slot at each of the angles of their external polygonal section.

The result is that the thickness of elastic material interposed between the tubular end-members and the tubular associated covering jacket, along the edges of the said end-members, is increased level with the transverse end-edges of the said covering jacket.

Finally, the damping devices according to the invention offer numerous advantages as compared with similar devices known at the present time.

In fact, it is possible to couple together piping systems by means of these damping devices, permitting simultaneously:

The conveyance of fluid at high pressures, such as necessitated for example in constructions of great height, and this especially by virtue of the tubular covering jacket;

expansion of these piping systems, and this especially by virtue of the depressions of the elastic sleeve which permit temporary deformations of this latter in spite of the tubular covering jacket in which it is enclosed;

effective isolation of the successive sections of these pipes, and this by virtue of the elastic sleeve, which is anchored with certainty and fluid-tightness on the tubular coupling end-members which it joins together.

The characteristic features and advantages of the invention will furthermore be brought out in the description which follows below, given by way of example, reference being made to the accompanying diagrammatic drawings, in which.

Figure 1:
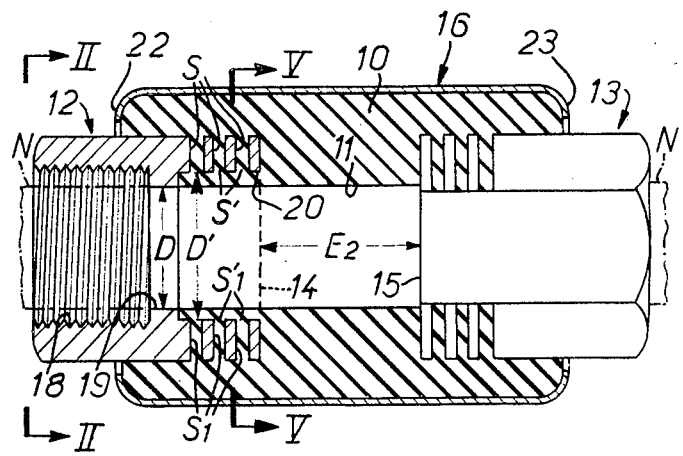
FIG. 1 is a view in axial cross-section of a damping device according to the invention, taken along the line I—I of FIG. 2, one of the tubular end-members of this damping device being shown in section and the other in elevation.
Figure 2:
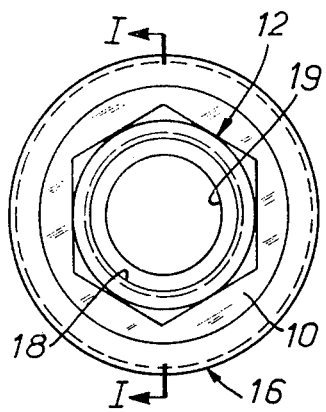
FIG. 2 is an end view of this damping device taken along the line II—II of FIG. 1.
Figure 3:
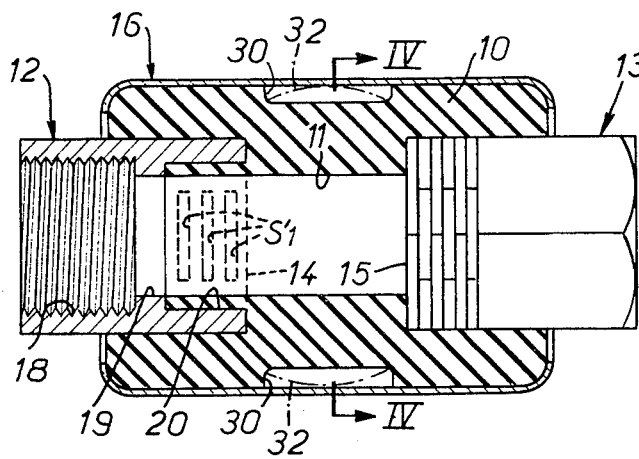
FIG. 3 is another view in axial section of this damping device, taken along the line III—III of FIG. 4.
Figure 4:
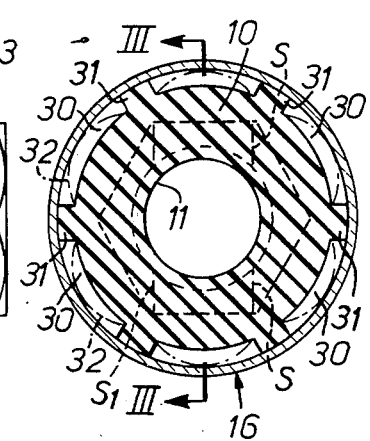
FIGS. 4 and 5 are views in axial section of this damping device taken respectively along the lines IV—IV of FIG. 3 and V—V of FIG. 1.

Generally, the damping device according to the invention, which is intended for coupling together two lengths of piping (not shown) comprises essentially an elastic coupling sleeve 10 having an internal axial bore 11 receiving at its end portions tubular end-members 12, 13, of which the opposite faces 14, 15 are spaced apart from each other by a predetermined distance E, the elastic sleeve 10 being surrounded by a tubular covering jacket indicated as a whole by the reference 16.

Figure 6:
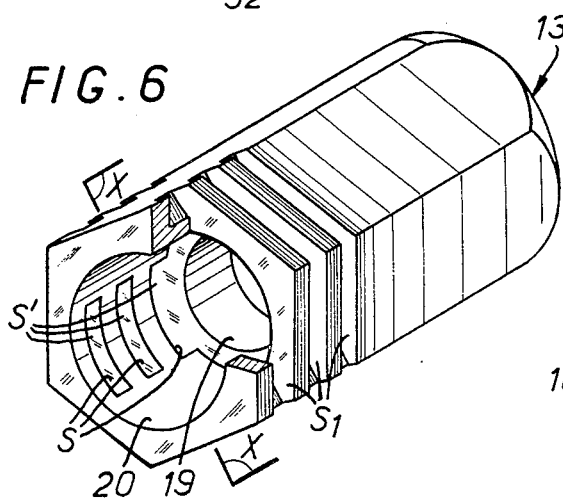
FIG. 6 is a perspective view to a different scale, with parts broken away, of a tubular end-member employed in a damping device of this kind.
Figure 5:
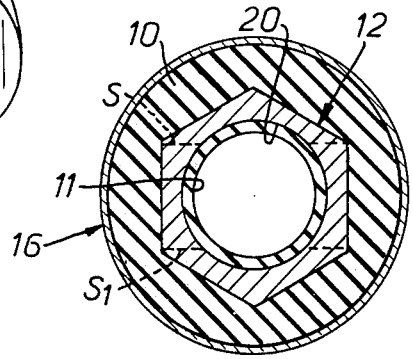

As can be seen from FIG. 6, on which the tubular end-member 13 is shown separately, such a tubular end-member is produced from a rod with a polygonal external section, hexagonal in the example shown, this end-member being cut-off from the said rod; the tubular end-member 12 is constituted in a similar manner.

In the example shown, the tubular end-members 12, 13 project from the elastic sleeve 10 which couples them together, at the extremities of this sleeve.

Internally, each tubular end-member 12, 13 comprises successively, spaced apart axially from the exterior towards the interior, a bore 18 threaded at its free end portion and then a smooth bore formed successively by a first section 19 of diameter D equal to the diameter of the bore 11 of the elastic sleeve 10, and a second section 20 having a diameter D' greater than the previous diameter D.

This second section 20 of the internal bore of an end-member 12, 13 may easily be formed by a larger internal bore of such an end-member.

For the purpose of anchorage of the elastic sleeve 10 on the end-members 12, 13, there is formed in these latter, level with the second section 20 of their smooth internal bore, a plurality of axially displaced transverse grooves.

In the example shown in FIGS. 1 to 6, such transverse grooves are formed symmetrically on each side of a plane X passing through the axis of the corresponding end-member.

In the example shown, three grooves S on the one hand and $S_1$ on the other are thus formed on each side of the plane X referred to above, level with the second section 20 of the smooth internal bore of each end-member 12, 13.

These grooves S, $S_1$ have sufficient depth to be able to open at S' and $S_1'$ respectively into the second section 20 of the smooth internal bore of each end-member 12, 13.

Furthermore, the tubular covering jacket 16 which surrounds the elastic sleeve 10 is provided at its extremities with transverse edges 22, 23, directed substantially radially in the direction of its axis, the said edges partly covering the corresponding extremities of the said elastic sleeve 10.

The damping device according to the invention can easily be effected by over-moulding the elastic sleeve 10 on the end-members 12, 13, the latter being suitably engaged on an internal core N, as shown diagrammatically in broken lines in FIG. 1.

During this over-moulding process, the rubber intended to form the elastic sleeve 10 penetrates and follows the profile of the grooves S and $S_1$ of each tubular end-member 12, 13, and beyond these grooves it forms an internal sheath in a continuously circular manner for the second section 20 of the smooth internal bore of these end-members.

During the moulding of the elastic sleeve 10, there is preferably provided a formation on the external surface of this sleeve and in its central zone of depressions 30, angularly distributed along a circle and forming between them ribs 31 adapted to support the internal wall of the associated tubular covering jacket 16.

This latter is then placed in position on the elastic sleeve 10, and after this positioning, the formation at its extremities of the transverse edges 22, 23 provided in these positions is effected by a simple rolling operation.

The threaded bore 18 of the tubular end-members 12, 13 permits the coupling of these end-members to the lengths of piping to be joined together, but other coupling arrangements may however be envisaged.

In particular, it may be advantageous to associate with each of these end-members a coupling of the type similar to those sold commercially under the name "UNION", which renders the damping device, according to the invention, readily removable, and which enables possible errors in length to be compensated on the sections of piping which it couples together.

As will have been understood, the depressions 30 permit deformation of the sleeve as indicated in broken lines 32 and thus enable the elasticity of such a sleeve to come into play in spite of the tubular covering jacket which encloses it.

Figure 7:
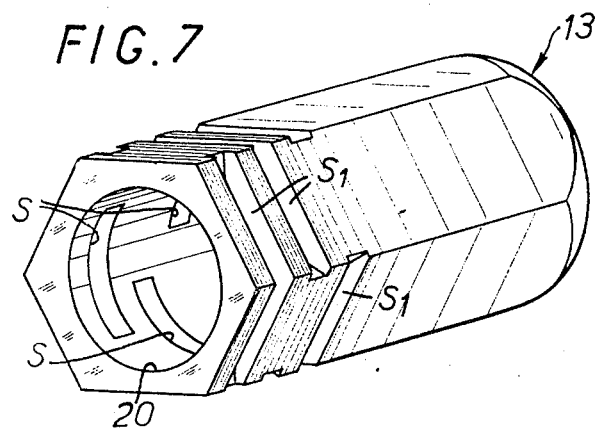
FIG. 7 is a perspective view similar to FIG. 6, and relates to an alternative form of construction.

According to the alternative form of construction illustrated by FIG. 7, the transverse grooves S and S₁ of an end-member 12, 13 are angularly displaced with respect to each other about the axis of such an end-member.

In the case illustrated of an end-member having a hexagonal external section, this angular displacement is 60° from one groove to the next.

It will be understood that the transverse grooves are not necessarily all angularly displaced with respect to each other; in fact, it is only necessary to displace one or more of them in order to obtain a baffle effect.

As will also have been understood, the transverse extremity edges 22 and 23 of the tubular covering jacket 16 insure conjointly, on the one hand the axial immobilization of this tubular covering jacket with respect to the elastic sleeve 10, and on the other hand an axial retention of this latter.

Figure 8:
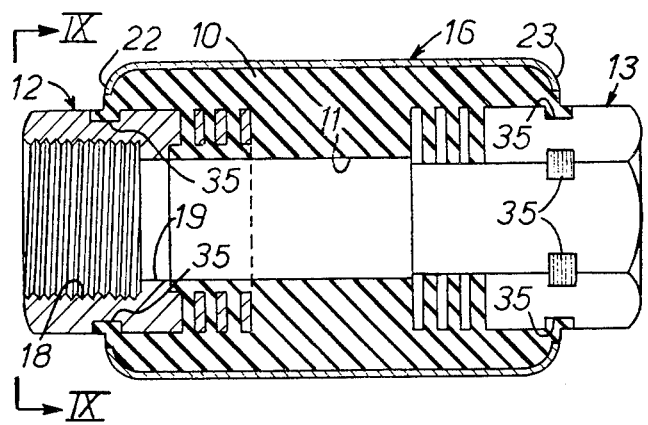
FIG. 8 is a partial view in axial section and relates to another alternative form of construction.
Figure 9:
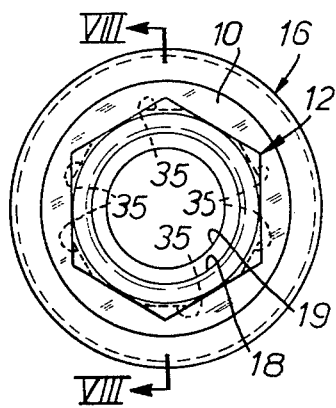
FIGS. 9 and 10 are respectively similar to FIGS. 1 and 2 and are concerned with another alternative form of construction.

According to the alternative form of construction illustrated by FIGS. 8 and 9, level with the transverse edges 22, 23, formed at the extremities of the tubular covering jacket 16, the tubular end-members 12, 13 are provided with a peripheral slot 35 at each of the angles of their external polygonal section.

During the over-moulding of the elastic sleeve 10, the constituent material of this sleeve also fills these slots 35, which increases at the level of the edges of the end-members 12, 13, the thickness of elastic material separating such end-members from the transverse edges 22, 23 of the tubular covering jacket 16.

Figure 10:
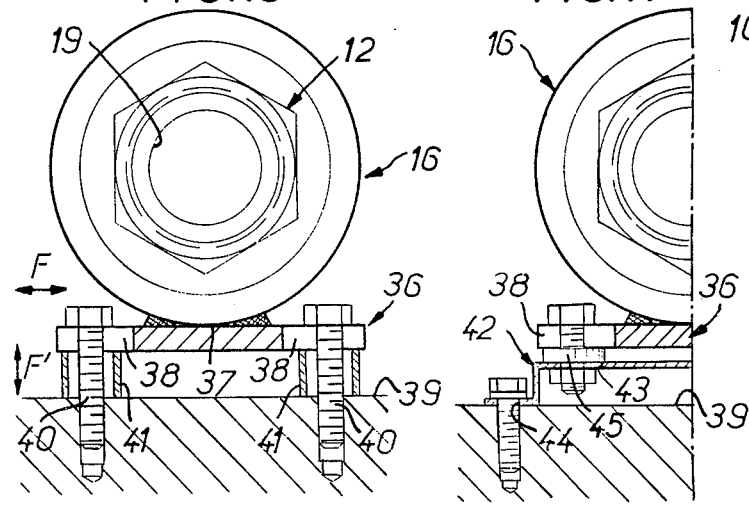
Figure 11:
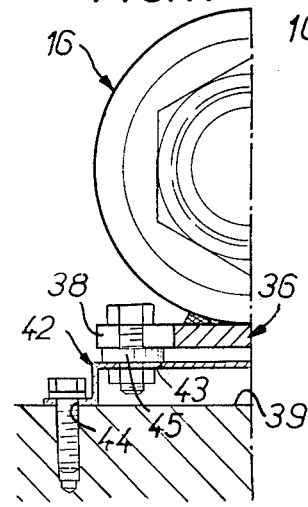
FIG. 11 is a partial view similar to FIG. 10, and illustrates an altternative method of use of the form of the embodiment shown in FIG. 10.

According to a development of the invention, and as illustrated in FIG. 10, the tubular covering jacket 16 is provided externally with fixing means which are integral with it and which are adapted to permit the fitting of the damping device according to the invention on a support of any kind.

In the example shown in full lines in this FIG. 10, these fixing means comprise a fixing plate 36 added tangentially, for example by welding, on the tubular covering jacket 16, and extending on each side of the zone 37 by which it is thus fixed on the tubular covering jacket 16.

This fixing plate 36 is provided at each of its extremities with at least one passage 38, and this passage 38 preferably forms an elongated slot opening freely to the exterior.

The fixing plate 36 provides in itself a direct fixing of the damping device according to the invention, on any supporting surface 39, as illustrated by FIG. 10.

This fixing is effected by means of tie-rods 40 which may be threaded, and the elongated slots 38 of the fixing plate 36 provide an adjustment of the position of the damping device parallel to the supporing surface 39 and perpendicularly to the axis of the device, as shown diagrammatically by the double arrow F.

Spacing washers 45 may be inserted between the fixing plate 36 and the stirrup 42 for adjustment perpendicularly to the supporting surface.

Thus, the damping device according to the invention is capable of serving in itself for fixing to any support the lengths of piping which it joins together, and this fixing may be effected in an adjustable manner with respect to this support, which enables any possible defects of alignment of these lengths of piping and/or any possible defects of flatness of this support to be compensated.

It will be understood that a plurality of fixing plates may be provided, or these latter may be replaced by a sole-plate.

Figure 12:
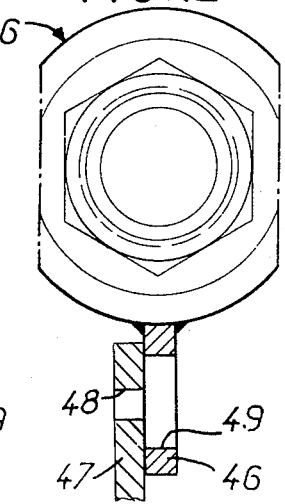
FIG. 12 is a partial view similar to FIG. 10, and relates to another alternative form of construction.

According to the alternative form construction illustrated by FIG. 12, a single fixing plate 46 is provided and this plate extends radially with respect to the tubular covering jacket 16 which carries it. This fixing plate is intended to cooperate with any auxiliary fixing member 47, a corner-plate for example, having preferably an elongated slot 48 crossed at right-angles by a slot 49 in the fixing plate 46.

It will of course be understood that the present invention is not limited to the forms of embodiment described and illustrated, but includes any alternative form of construction and/or of combination of their various parts.

In particular, the number of sides of the external geometrical section of the tubular end-members, and/or the number of transverse grooves which they comprise, may be different from those indicated above.

Having thus described my invention, what I claim as new and desire to secure by Letters Patent of the United States is:

1. A damping device for coupling together two lengths of pipe to permit the conveyance of fluid under pressure from one length to the other, comprising two tubular end members, polygonal in transverse section, spaced apart from each other, said end members including a plurality of transverse grooves extending through from the peripheries to the bores of said members, said members each having in addition, a continuous peripheral groove spaced closer to the extremities of said device than said first mentioned grooves, said peripheral groove extending partially into the body of said members, an elastic sleeve over-molded on said end members and including components extending into said grooves, a tubular covering jacket surrounding said sleeve, said jacket being provided at its extremities with transverse inturned edges directed substantially radially in the direction of the axis of said members, said edges partially covering the corresponding extremities of said sleeve, said edges being disposed in alignment with said continuous grooves in said members, and fixation means rigidly connected to said jacket for mounting said device to a support.

2. A shock absorbing damping device for coupling two lengths of piping to permit the conveyance of fluid under pressure from one said length to the other, comprising two tubular end members in spaced relation, a plurality of transverse grooves formed in said end members, said grooves extending entirely through said members from the periphery to the internal bores thereof, an elastic sleeve molded over said end members and including components extending through said transverse grooves, and a tubular covering jacket surrounding said sleeve, portions of said sleeve, in the area between said end members, being radially inwardly spaced from said jacket to define at least one cavity whereby portions of said sleeve may expand into said cavity responsive to pressures of a predetermined magnitude in said bore.

3. A damping device for coupling two lengths of piping comprising a pair of tubular end members spaced from each other, said end members including a plurality of transverse grooves extending through said members from the periphery to the internal bore thereof, an elastic sleeve over-molded on said end members and including portions extending into said grooves, said sleeve including at its terminal edge shoulder portions spaced outwardly from the periphery of said end members, and a tubular covering jacket surrounding said sleeve, said jacket including inturned portions outwardly lapping the terminal ends of said sleeve to immobilize said jacket against axial movement relative to said sleeve, and fixation means rigidly carried by said jacket for mounting said device to a support.

* * * * *